(12) United States Patent
De La Rosa et al.

(10) Patent No.: US 11,845,616 B1
(45) Date of Patent: Dec. 19, 2023

(54) FLATTENING AND ITEM ORIENTATION CORRECTION DEVICE

(71) Applicant: Amazon Technologies, Inc., Seattle, WA (US)

(72) Inventors: Jose Luis De La Rosa, Seattle, WA (US); Larry Joe Robb, Miramar Beach, FL (US); Justin Stone, Frisco, TX (US); Emily R Parrish, Seattle, WA (US); Joshua Martin Middleton, Seattle, WA (US); Maxim P Hoffman, Bothell, WA (US); Roland J Menassa, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 584 days.

(21) Appl. No.: 16/990,311

(22) Filed: Aug. 11, 2020

(51) Int. Cl.
*B65G 47/22* (2006.01)
*B65G 47/24* (2006.01)
(Continued)

(52) U.S. Cl.
CPC ............... *B65G 47/22* (2013.01); *B07C 1/18* (2013.01); *B07C 3/18* (2013.01); *B07C 5/10* (2013.01);
(Continued)

(58) Field of Classification Search
CPC .... B07C 1/18; B07C 3/18; B07C 5/10; B07C 2501/0063; B25J 9/0093; B25J 9/163; B25J 9/1633; B25J 9/1697; B25J 13/085; B25J 13/088; B25J 15/0019; G05B 13/0265; B65G 39/07; B65G 47/24; B65G 2203/0216; B65G 2203/0233; B65G 2203/041; B65G 47/22; G06N 20/00; G06Q 10/087
See application file for complete search history.

(56) References Cited

U.S. PATENT DOCUMENTS

| | | | | |
|---|---|---|---|---|
| 3,781,938 A | * | 1/1974 | Dunkley | ............ B60S 3/06 |
| | | | | 15/53.2 |
| 4,070,966 A | * | 1/1978 | Edon | ......................... B41F 3/20 |
| | | | | 101/269 |

(Continued)

FOREIGN PATENT DOCUMENTS

| | | | | |
|---|---|---|---|---|
| DE | 102017126412 A1 | * | 5/2019 | ............ B65B 25/06 |
| WO | WO-2007067947 A2 | * | 6/2007 | .......... B25J 11/0055 |

*Primary Examiner* — Thomas Randazzo
(74) *Attorney, Agent, or Firm* — Eversheds Sutherland (US) LLP

(57) ABSTRACT

A device for manipulating items for facility operations is described. The device includes a first arm assembly that includes a first arm, a second arm parallel to the first arm, a first shaft disposed between the first arm and the second arm at a first location along the first arm and the second arm, and a first head attachment disposed between the first arm and the second arm at a second location along the first arm and the second arm. The device also includes a first driver coupled to the first shaft and configured to control movement of the first arm assembly about a first axis extending along a length of the first shaft. The device further includes a second driver coupled to first head attachment and configured to control movement of the first head attachment about a second axis extending along a length of the first head attachment.

18 Claims, 11 Drawing Sheets

(51) Int. Cl.
  *B07C 3/18* (2006.01)
  *B07C 5/10* (2006.01)
  *G06N 20/00* (2019.01)
  *G06Q 10/087* (2023.01)
  *B07C 1/18* (2006.01)
  *G05B 13/02* (2006.01)
  *B25J 13/08* (2006.01)
  *B65G 39/07* (2006.01)
  *B25J 9/16* (2006.01)
  *B25J 9/00* (2006.01)
  *B25J 15/00* (2006.01)

(52) U.S. Cl.
  CPC ......... *B65G 47/24* (2013.01); *G05B 13/0265* (2013.01); *G06N 20/00* (2019.01); *G06Q 10/087* (2013.01); *B07C 2501/0063* (2013.01); *B25J 9/0093* (2013.01); *B25J 9/163* (2013.01); *B25J 9/1633* (2013.01); *B25J 9/1697* (2013.01); *B25J 13/085* (2013.01); *B25J 13/088* (2013.01); *B25J 15/0019* (2013.01); *B65G 39/07* (2013.01); *B65G 2203/0216* (2013.01); *B65G 2203/0233* (2013.01); *B65G 2203/041* (2013.01)

(56) References Cited

U.S. PATENT DOCUMENTS

| | | | | |
|---|---|---|---|---|
| 4,118,730 A * | 10/1978 | Lemelson | ................ | G07D 7/12 386/300 |
| 4,338,626 A * | 7/1982 | Lemelson | ........ | G08B 13/19634 348/94 |
| 4,511,918 A * | 4/1985 | Lemelson | ........ | G08B 13/19602 386/210 |
| 4,630,225 A * | 12/1986 | Hisano | ................... | G06V 10/40 348/94 |
| 4,660,086 A * | 4/1987 | Lemelson | ............ | G01B 11/022 348/135 |
| 4,697,689 A * | 10/1987 | Carrell | .................... | B07C 1/18 414/757 |
| 5,141,216 A * | 8/1992 | Ballestrazzi | ......... | B65H 39/043 198/457.06 |
| 5,221,405 A * | 6/1993 | Trouteaud | ............ | B65C 9/1884 156/364 |
| 9,238,304 B1 * | 1/2016 | Bradski | .................. | B65G 47/50 |
| 9,457,474 B1 * | 10/2016 | Lisso | ...................... | B26D 1/45 |
| 10,155,343 B2 * | 12/2018 | Eyal | ..................... | B29C 66/1162 |
| 10,407,201 B1 * | 9/2019 | Rodgers | ................. | B65C 1/021 |
| 10,611,510 B1 * | 4/2020 | Koch | ................... | B65C 9/0015 |
| 2001/0029766 A1 * | 10/2001 | Wiens | .................. | B21D 39/021 72/312 |
| 2006/0075797 A1 * | 4/2006 | Baulier | ................ | B21D 39/021 72/220 |
| 2006/0151296 A1 * | 7/2006 | Halang | ................ | B65G 47/244 198/623 |
| 2012/0298481 A1 * | 11/2012 | Fourney | ................ | B65G 39/00 198/413 |
| 2014/0088765 A1 * | 3/2014 | Valpola | ................. | B25J 9/1697 700/259 |
| 2015/0183535 A1 * | 7/2015 | Vardakostas | ............ | B65B 43/14 53/72 |
| 2015/0210483 A1 * | 7/2015 | Morency | .............. | B65G 47/244 198/411 |
| 2015/0336698 A1 * | 11/2015 | Keller | .................... | B65H 45/12 53/540 |
| 2018/0093647 A1 * | 4/2018 | Simpson | ............... | A46B 13/003 |
| 2018/0243800 A1 * | 8/2018 | Kumar | ................... | G06N 20/00 |
| 2018/0346276 A1 * | 12/2018 | Hivatal | ................. | B65H 26/00 |
| 2018/0370038 A1 * | 12/2018 | Saac | ..................... | B25J 9/161 |
| 2019/0118988 A1 * | 4/2019 | Thuring | .................... | B65C 9/36 |
| 2019/0185190 A1 * | 6/2019 | Fechter | ................... | B65B 21/18 |
| 2019/0188435 A1 * | 6/2019 | Davis | ..................... | G06V 10/10 |
| 2020/0094997 A1 * | 3/2020 | Menon | .................. | B25J 9/1697 |
| 2020/0238339 A1 * | 7/2020 | Bellar | ................... | G05B 19/4189 |
| 2020/0238534 A1 * | 7/2020 | Goldberg | ............... | B25J 9/0093 |
| 2020/0269448 A1 * | 8/2020 | Ooba | ................... | B25J 9/10 |

* cited by examiner

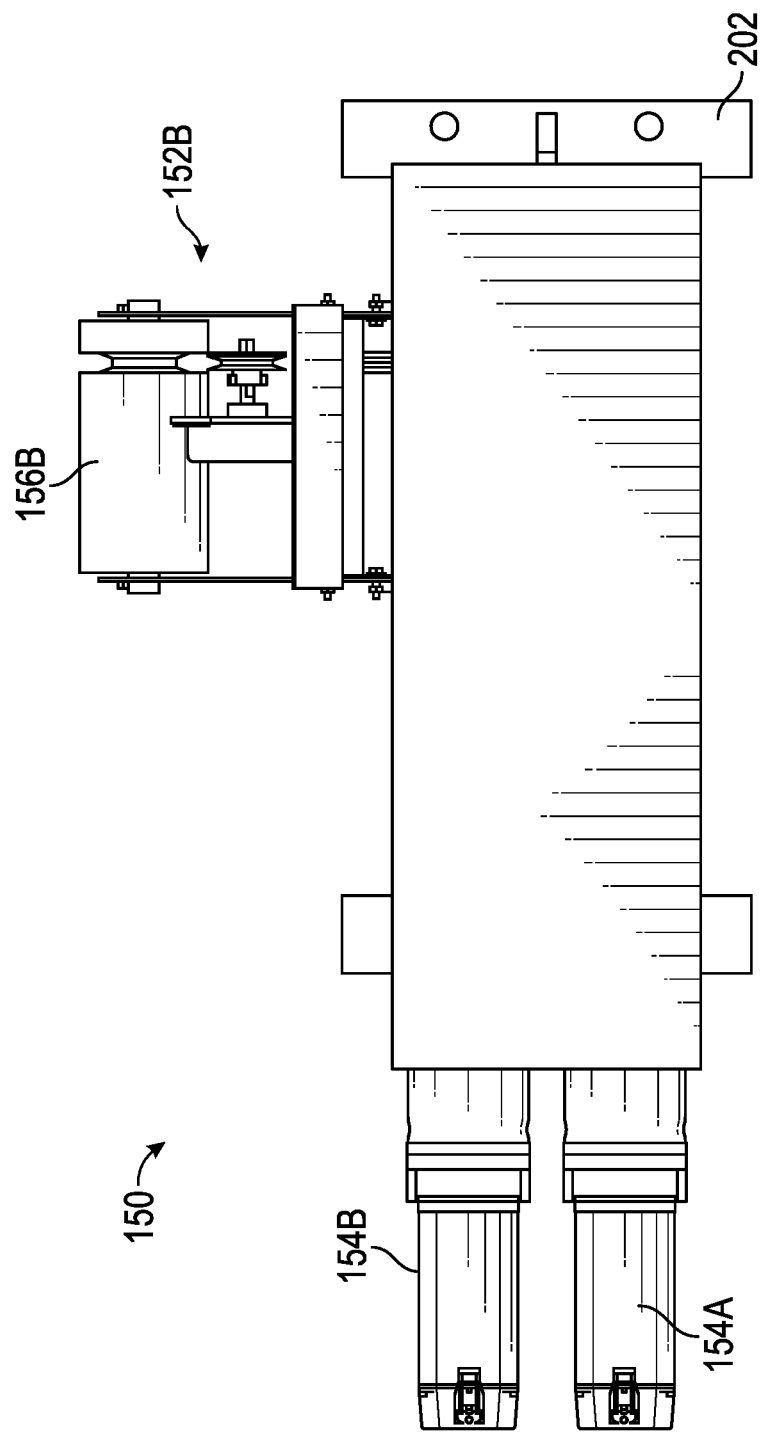

FLATTENING AND ITEM ORIENTATION CORRECTION DEVICE

BACKGROUND

The present invention relates to a system and device for manipulating items for facilitating facility operations (or processes).

Many facilities (e.g., warehouses, plants, distribution centers, storehouses, factories, etc.) perform tasks such as storing items, sorting items, packaging items, shipping items, and the like. As an item moves within a facility (e.g., from receiving the item(s) to storing the item(s), from storing the item(s) to shipping the item(s), etc.), items may become improperly oriented and misaligned for downstream processes. For example, certain induction processes within the facility may cause an item to be in a position where the item has an obscured barcode, may cause an item to travel in a direction perpendicular to the conveyor, may cause an item to be positioned away from the center of the conveyor belt, etc. For downstream processes within the facility that rely on items having visible barcodes and/or being in certain orientations and positions, these product orientation issues can impact the efficiency of the downstream processes.

BRIEF DESCRIPTION OF DRAWINGS

Various embodiments in accordance with the present disclosure will be described with reference to the drawings, where like designations denote like elements.

FIG. 4B shows a top view of the other manipulation device, according to one embodiment.

DETAILED DESCRIPTION

Figure 1:
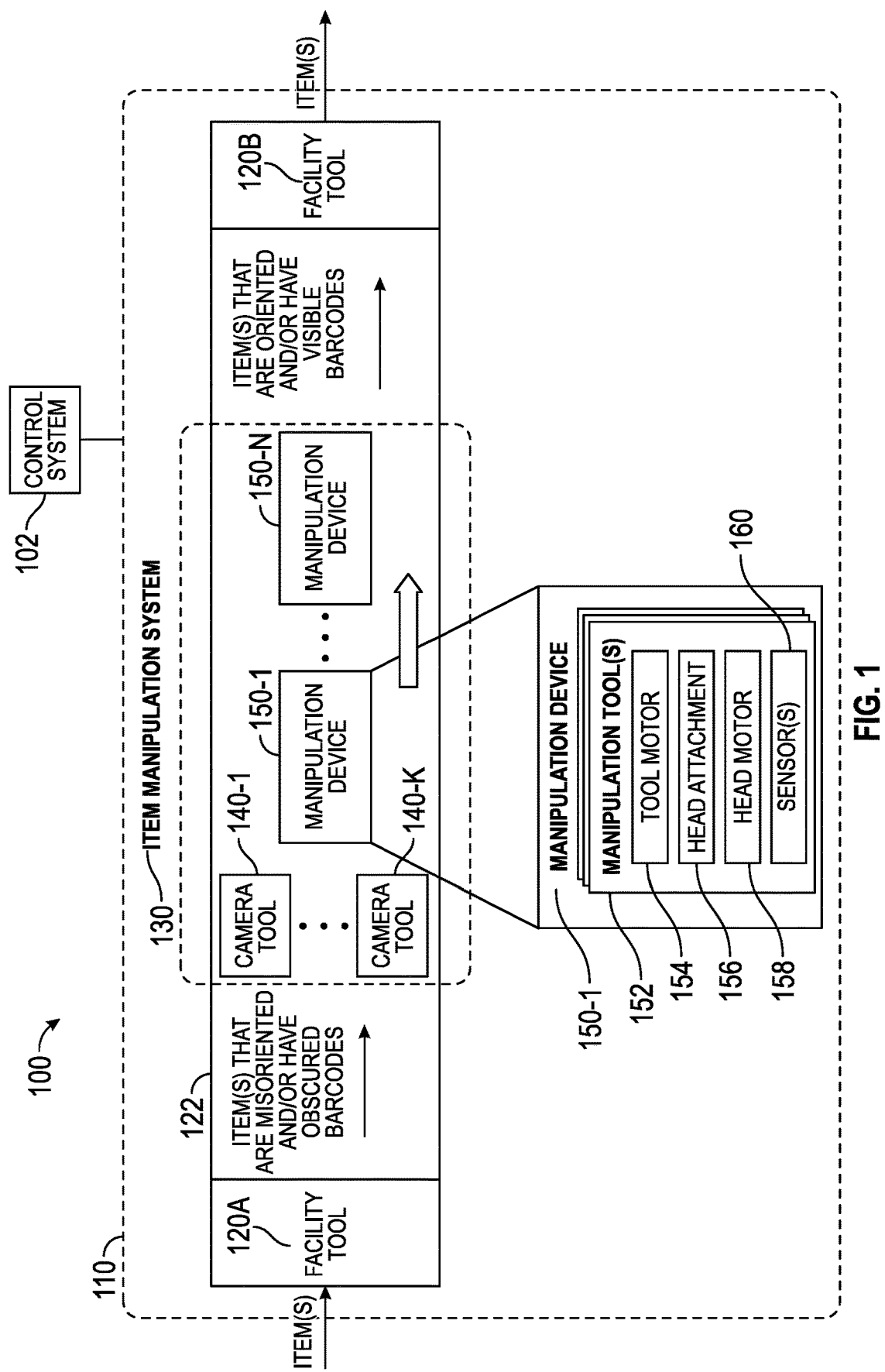
FIG. 1 is a block diagram illustrating an example item manipulation system within a facility, according to one embodiment.
Figure 2A:
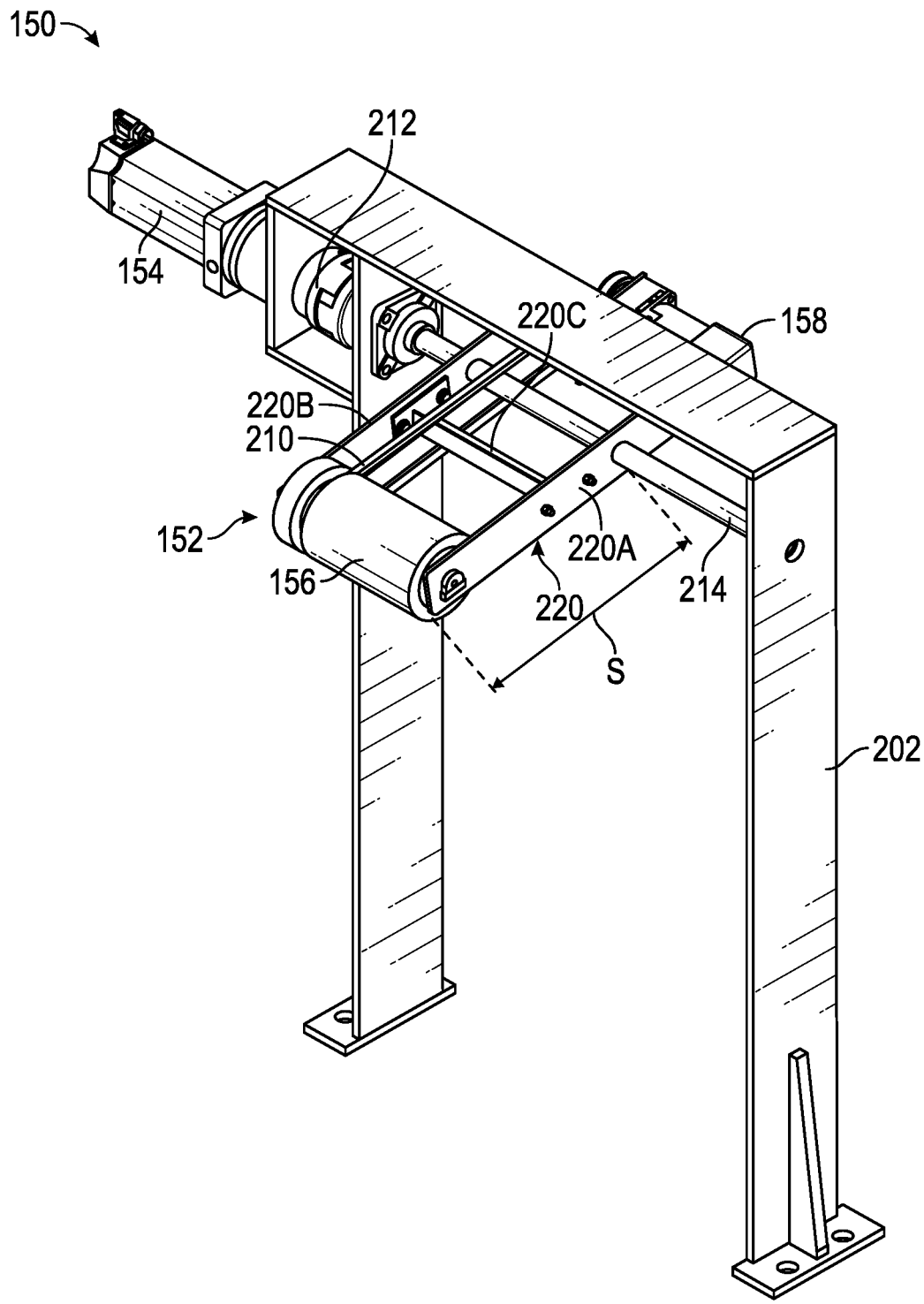
FIG. 2A shows a perspective view of a manipulation device, according to one embodiment.
Figure 2B:
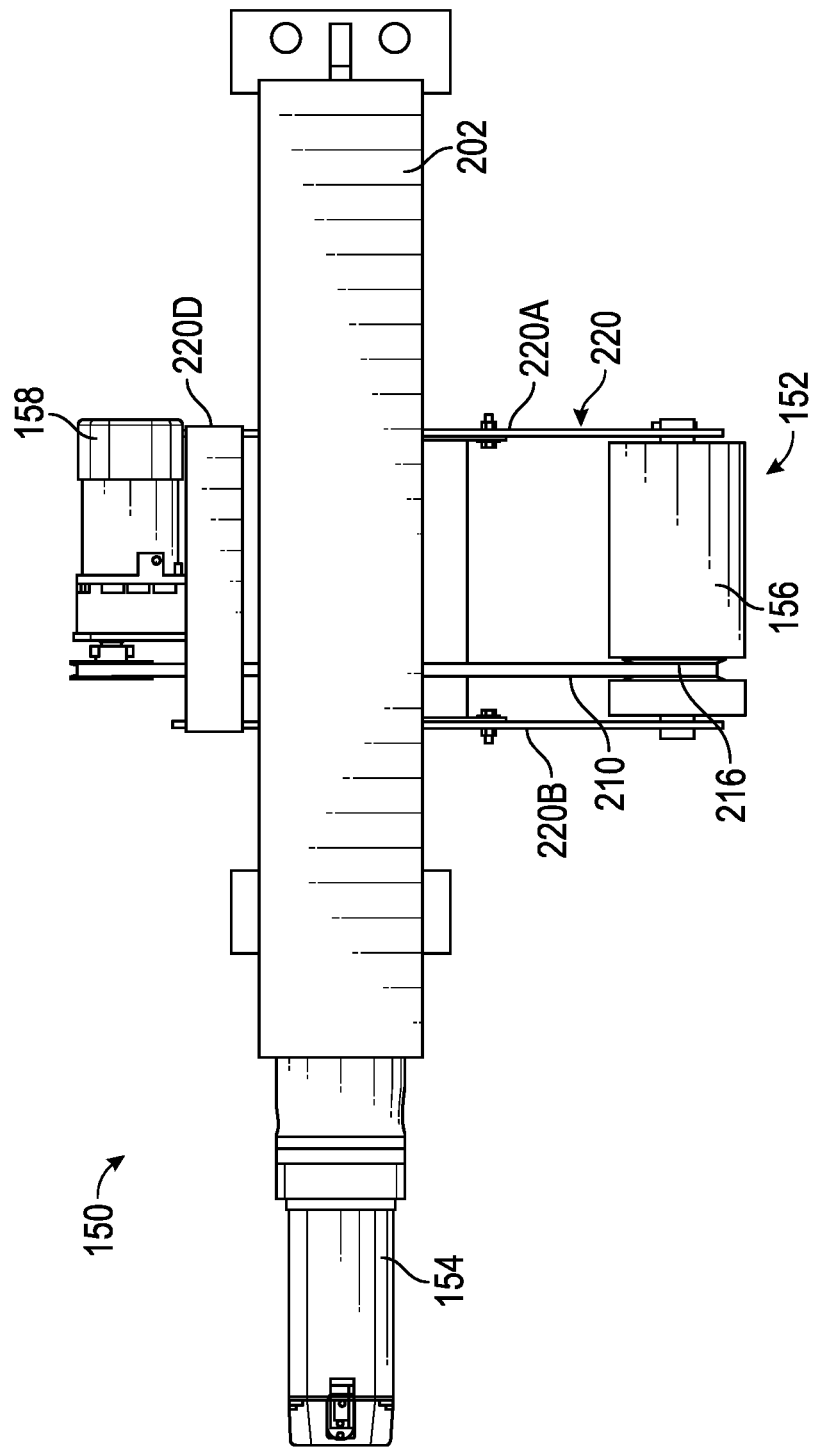
FIG. 2B shows a top view of the manipulation device, according to one embodiment.
Figure 2C:
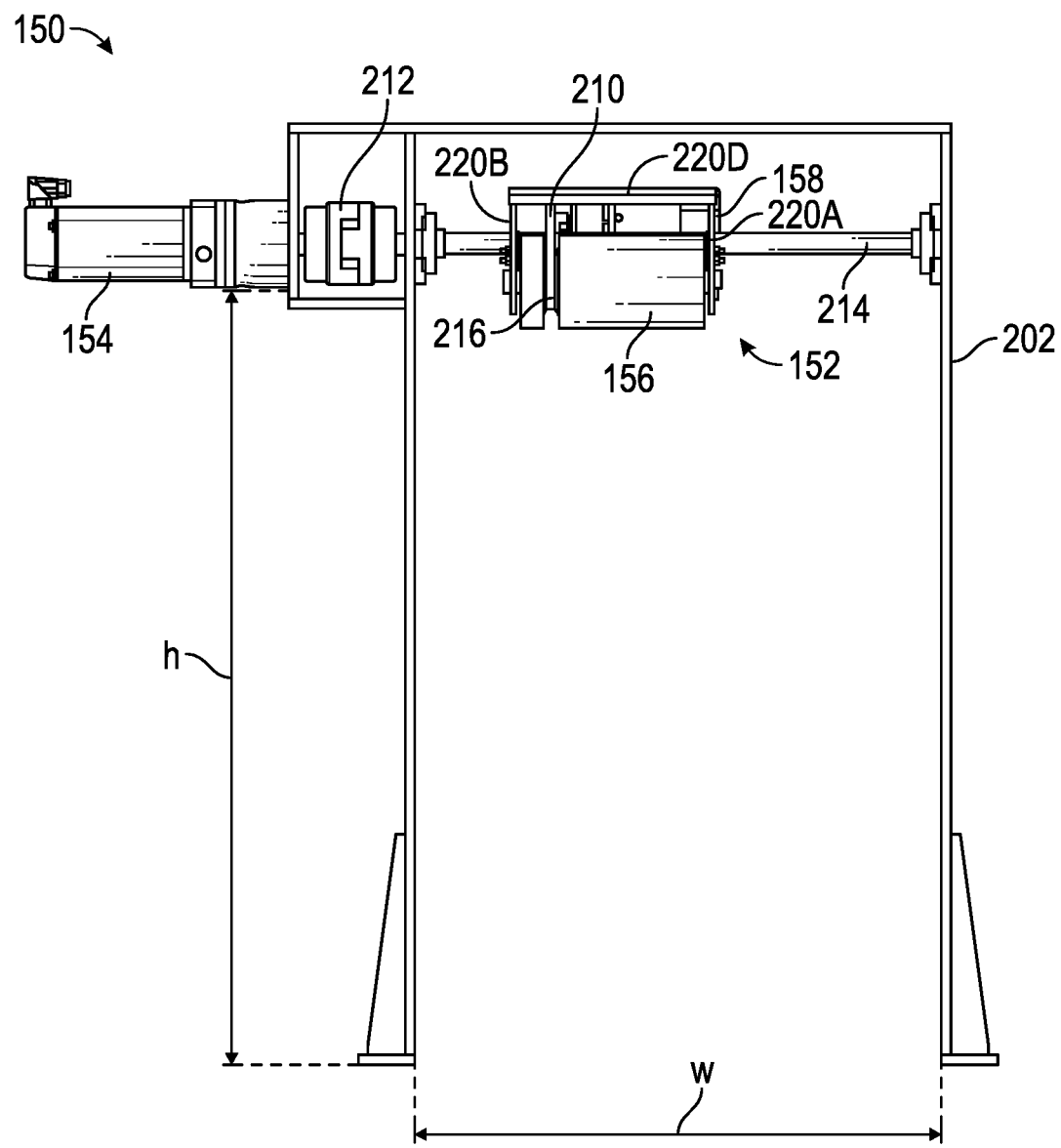
FIG. 2C shows a front view of the manipulation device, according to one embodiment.
Figure 2D:
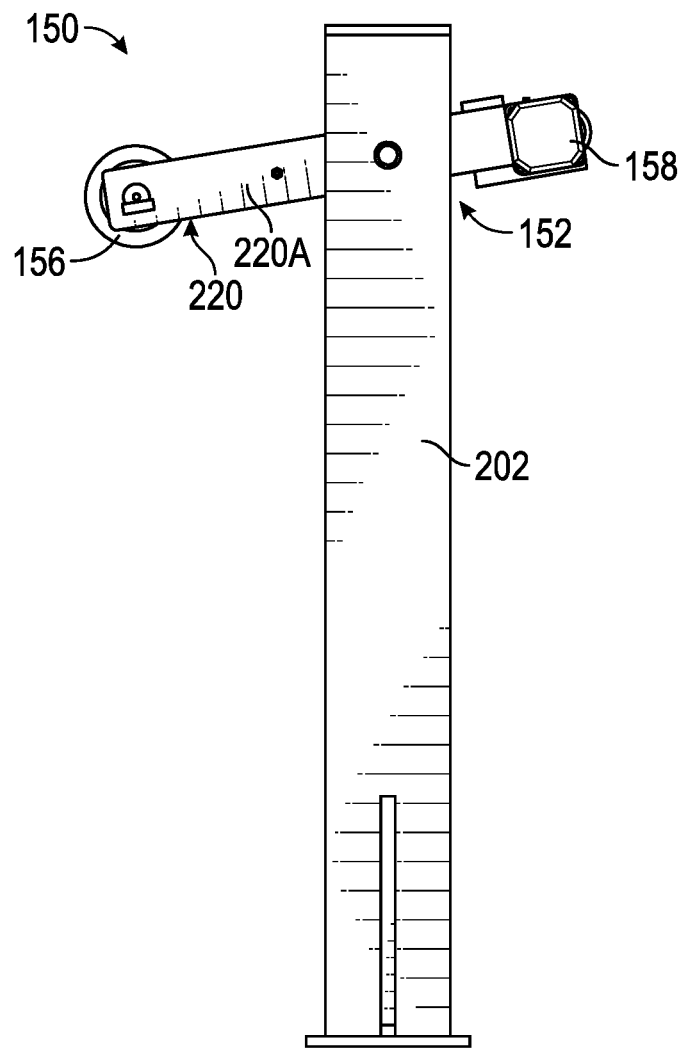
FIG. 2D shows a side view of the manipulation device, according to one embodiment.

Embodiments describe a system for manipulating items, for example, by flattening or unfolding the items, correcting the orientation and/or position of the items, etc. In some embodiments, the system described herein can manipulate item(s) for one or more operations (e.g., sorting, shipping, staging, etc.) within a facility. For example, certain processes within a facility may cause the barcodes on items to become obscured (e.g., the barcode may be partially or fully concealed, such that it is unidentifiable by a scanning device) and/or cause items to become improperly oriented for further downstream processes within the facility. In one particular instance, as items move within the facility, the items may go through one or more automated singulation processes, which generally involve separating (or isolating) an item from a larger group of items (e.g., in a container, on a conveyor belt, etc.). The larger group of items may include items that are touching, overlapping, in close proximity, etc. The items may be singulated in order to prepare the items for a particular action (e.g., storage, shipping, sorting, etc.).

Continuing with this example, as a result of the automated singulation process, identifying information associated with an item (e.g., a barcode) can be obscured, making it difficult for other downstream processes (e.g., sorting operations, shipping operations, etc.) to identify the item. For example, during an automated singulation process, items can be flipped, rotated, turned over, tilted, crinkled, folded, etc. In one particular example described in more detail below, a bagged item exiting the automated singulation process can be folded in such a manner that the barcode on the bagged item is obscured and cannot be read (or scanned) by barcode readers within the facility. This inability to accurately and reliably identify items can impact the efficiency of downstream processes (e.g., the inability to scan the barcode of a singulated item can impact sorting and shipping operations within the facility).

In one embodiment described herein, an item manipulation system is used to correct barcode visibility issues and/or orientation issues associated with items. In some embodiments, the item manipulation system can be used to properly prepare an item, e.g., by making the item's barcode visible and/or correcting the item's orientation and/or position, for a particular process. In one particular embodiment, the item manipulation system can be disposed over an induction conveyor to an automated sorting system and prepare items for scanning by the automated sorting system. Note, however, that this is merely an example of where the item manipulation system can be used and that the item manipulation system can be disposed in other locations.

As described below, the item manipulation system can include one or more manipulation devices (also referred to herein as manipulation apparatuses, item manipulators, item flatteners, and the like), which can flatten (or unfold) an item in order to make the item's barcode visible (e.g., to a scanning device). For example, the item may be a bagged item that is folded or crinkled, such that the barcode on the item is obscured and cannot be detected by barcode reader(s) within the facility.

Additionally or alternatively, the manipulation device(s) can re-orient and/or reposition an item so that the item is in a correct orientation and/or position for a downstream activity (or process or system) within the facility. For example, as a result of an automated process (e.g., singulation process), the item may become improperly oriented, such that it cannot be properly received by another automated process (e.g., sorting process) within the facility.

Note that while many of the following embodiments describe the item manipulation system preparing items for one or more facility operations (e.g., sorting, shipping, etc.), the item manipulation can be used in different environments (e.g., retail stores, grocery stores, etc.). In some embodiments, the item manipulation system can be used as a standalone device to correct the orientation and/or barcode visibility issues of item(s).

FIG. 1 is a block diagram illustrating an example item manipulation system 130 within a facility 100, according to one embodiment. As shown, the facility 100 includes a control system 102 and an equipment (or machine) area 110. The equipment area 110 is representative of various phase(s)

of facility operations known to a person of ordinary skill in the art. In one example, the equipment area 110 can include one or more receiving stations to singulate disparate items as they are initially received into the facility. In another example, the equipment area 110 can include a sorting station to route singulated items to different packaging stations (e.g., for order fulfillment). Other examples of facility operations that may take place within the equipment area 110 include staging at loading zones or other predefined regions within a facility, loading onto and/or off vehicles, and so forth.

In this particular embodiment, the equipment area 110 includes a facility tool 120A, a facility tool 120B, an induction conveyor 122, and an item manipulation system 130. The induction conveyor 122 generally represents sections of the equipment area 110 in which items are moved (or transitioned or inducted) to other operations within the equipment area 110. In this particular embodiment, the induction conveyor 122 transitions item(s) that exit the facility tool 120A to the facility tool 120B.

The induction conveyor 122 can have a variety of different configurations (e.g., shape, material, angle, height (or elevation), etc.), suitable for a given equipment area 110 within a facility 100. For example, one or more portions of the induction conveyor 122 can be flat (without an inclination), tilted (e.g., with an inclination), can have different heights (or elevations) relative to other portions of the induction conveyor 122, can have a surface shape that is substantially planar, crowned, domed, concave, convex, irregular, or any other shape or combination of shapes, can be formed of one or more of a variety of materials (e.g., metal, plastic, foam, rubber, fabric, carpet, wood, tile, etc.), and the like. Note that although FIG. 1 depicts induction conveyor 122 as a single conveyor, the induction conveyor 122 can include a series of conveyors (or conveyor belts) (that may have different configurations).

The facility tools 120A and 120B are representative of various tools used in facility processes, such as sorting, shipping, singulation, etc. In one embodiment, the facility tool 120A is an automated singulation tool that can receive non-singulated items (e.g., from a loaded tote (or container), from a pallet or cart, from a loading area, etc.) and output singulated items (e.g., item(s) having a predetermined gap distance from other item(s)). In some embodiments, the facility tool 120A can be used to prepare items for another process (e.g., shipping, sorting, etc.) within the facility.

For example, as shown in FIG. 1, after exiting the facility tool 120A, items can transition onto induction conveyor 122 towards facility tool 120B. In one embodiment, the facility tool 120B is an automated sorting tool that can route items to different packaging stations for order fulfillment. In some cases, the operation of the facility tool 120B may depend in part on successfully identifying the items that are inducted into the facility tool 120B. In embodiments where the facility tool 120B is an automated sorting tool, for example, the automated sorting tool may have to scan identifying information (e.g., a barcode) on each item in order to accurately route the item to the correct packaging station. Additionally, in some cases, the operation of the facility tool 120B may depend in part on each item being inducted into the facility tool 120B having a predetermined size (e.g., the facility tool 120B may not be able to accept items above a predetermined weight), being in a particular orientation (e.g., the facility tool 120B may not accept items having at least one dimension outside a predefined dimension range), and/or being in particular position on the induction conveyor 122 (e.g., the facility tool 120B may not accept items that are located outside of a predefined position (or zone) on the induction conveyor 122).

However, in some cases, due in part to the operations of the facility tool 120A, one or more items exiting the facility tool 120A may have obscured (or covered or partially covered) barcodes which can make it difficult for the facility tool 120B to identify the items. For example, one or more item(s) may be bagged item(s) that has become crinkled (obscuring the barcode), folded (completely or at least partially covering the barcode), and the like, due to the operations of the facility tool 120A. Additionally or alternatively, due in part to the operations of the facility tool 120A, one or more items exiting the facility tool 120B may be improperly oriented, preventing the item(s) from being successfully inducted into the facility tool 120B. For example, the item(s) may be improperly oriented, such that the dimensions of the item along a particular axis (e.g., x, y, or z axes) extends beyond a predefined range for the axis for successful induction into the facility tool 120B. As another example, the item(s) may be improperly positioned, such that the item is outside of a predefined position or predefined zone on the induction conveyor 122 for successful induction into the facility tool 120B.

In one embodiment described herein, the item manipulation system 130 is situated in proximity to (e.g., above) the induction conveyor 122 and is used to manipulate items exiting the facility tool 120A that have obscured barcodes and/or are improperly oriented, so that the items upon exiting the item manipulation system 130 have visible barcodes and/or are correctly oriented, prior to induction into the facility tool 120B. As shown, the item manipulation system 130 includes one or more camera tools 140 1-K and one or more manipulation devices 150 1-N. The camera tools 140 1-K are configured to detect item(s) that exit the facility tool 120A and determine the type of the items. For example, in some embodiments, the camera tools 140 may be dimensioning camera devices that can determine dimensions of a particular item, determine position and/or orientation of the item on the induction conveyor 122, determine whether identifying information (e.g., barcode) is visible on the item, etc.

Each manipulation device 150 includes one or more manipulation tools 152. Each manipulation tool 152 includes a tool motor (or driver) 154, a head attachment 156 (also referred to as a tool head), a head motor (or driver) 158, and one or more sensors 160. The tool motor 154 is configured to control movement of the manipulation tool 152. As described below, the tool motor 154 can move the manipulation tool 152 into different positions over the induction conveyor 122, depending on its operation. For example, the tool motor 154 can move the manipulation tool 152 into a first (down) position to interact with an item on the induction conveyor 122, move the manipulation tool 152 into a second (mid) position after interacting with an item on the induction conveyor 122, move the manipulation tool into a third (upper) position to allow for movement of other manipulation tool(s) 152 on the manipulation device 150, etc. The tool motor 154 can include, for example, an alternating current (AC) motor, direct current (DC) motor, servo motor, incremental drive motors, etc.

The head attachment 156 is an attachment component of the manipulation tool 152 that interacts with (or engages) the item to manipulate the item. The head attachment 156 is generally an interchangeable component and can have a variety of different configurations, shapes, materials, components, etc. This allows for each manipulation tool 152 to be configured with different types of head attachments 156, depending on the type of interaction configured for that manipulation tool 152. For example, in some embodiments, the head attachment 156 is a roller, which can be used to flatten items, unfold items, etc. The roller can be coated with different types of material (e.g., rubber) to reduce the amount of force when contacting a given item. In some embodiments, the roller can have one or more grooves (e.g., on the outside of the roller) that can be used to shift the item in a particular motion. For instance, the groove(s) on the roller may have a spiral pattern (or configuration), which allows the roller to shift an item along the pattern as the roller engages with the item. In other embodiments, the head attachment 156 is a brush, which can be used to uncrinkle items. In these embodiments, the brush head attachment can have different amounts and/or different types of bristle material depending on the type of item and/or desired type of interaction. In general, the head attachment 156 can have any shape or combination of shapes and/or can be formed of one or more of a variety of materials (e.g., metal, plastic, foam, rubber, fabric, carpet, wood, tile, etc.), etc.

The head motor 158 is configured to control movement of the head attachment 156. As described below, the head motor 158 can control direction of the head attachment 156, for example, spinning the head attachment 156 in a forward (clockwise) direction, spinning the head attachment 156 in a backwards (counterclockwise direction), etc. The head motor 158 can include, for example, an AC motor, DC motor, flat motor, etc.

The sensor(s) 160 generally include proximity sensors, force sensing sensors, laser (detection) sensors, etc. The sensor(s) 160 can be disposed at various locations on the manipulation tool 152. For example, the tool motor 154 can include a sensor 160 for determining a position of the manipulation tool 152. In another example, the head motor 158 can include a sensor 160 for detecting presence of an item and/or a sensor 160 for detecting an amount of force applied to an item.

Although not shown in FIG. 1, in some embodiments, the manipulation device 150 can include a (local) controller and a network interface. The (local) controller, for example, can be a processor or a micro-controller which receives commands from the control system 102 (e.g., using the network interface) and issues corresponding commands to the manipulation tools 152 on the manipulation device 150. In addition to receiving information from the control system 102, the (local) controller can transmit information to the control system 102 using the network interface. For example, the (local) controller can send information from sensor(s) 160 indicating position(s) of the manipulation tool(s) 152, amount of force applied to items by the manipulation tool(s) 152, etc. The control system 102 may use the information received from the controller to determine which commands (e.g., stop command, start command, etc.) to send to the controller. The (local) controller can include solely hardware and firmware or can include combinations of hardware and software elements. The network interface may communicate using a wired communications protocol (e.g., Ethernet), a wireless communication protocol (e.g., WiFi), etc.

In other embodiments, the manipulation device 150 may not be equipped with a (local) controller. In these embodiments, the control system 102 may send commands directly to the manipulation tool(s) 152 of the manipulation device 150 to control the manipulation tool(s) 152. Similarly, the control system 102 can receive feedback from the manipulation tool(s) 152 directly from the manipulation tool(s) 152 on the manipulation device 150.

In embodiments described herein, the item manipulation system 130 can detect item(s) that exit the facility tool 120A, e.g., via the camera tools 140 1-K, and can determine whether the item(s) need to be manipulated, e.g., by one or more manipulation devices 150 1-N. For example, the camera tools 140 1-K can capture information (e.g., item dimensions, item position, item type, whether identifying information on the item is visible, etc.) regarding an item and send the information to the control system 102, which can use the information to determine whether the item needs to be manipulated. In one embodiment, the control system 102 uses predefined rules to determine whether a given item needs to be manipulated. For example, if the control system 102 determines that the dimension(s) of an item are within a predefined induction range and/or that the identifying information on the item is visible, then the control system 102 can determine that manipulation of the item is not needed and can refrain from activating one or more of the manipulation devices 150 1-N.

In another example, if the control system 102 determines that the dimension(s) of an item are outside a predefined induction range and/or that the identifying information on the item is obscured, then the control system 102 can determine that manipulation of the item is needed. In this instance, the control system 102 can determine, based in part on the information received from the camera tools 140 1-K, the manner in which the item should be manipulated. This may include, for example, determining which set of manipulation devices 150 to activate, which manipulation tool(s) 152 on each manipulation device 150 to activate, amount of force to apply to the item by each of the manipulation tool(s) 152, etc.

In one embodiment, the control system 102 uses one or more machine learning tools to determine the manner in which the item should manipulated. For items that need limited manipulation (e.g., the item may be lightly folded, such that the barcode on the item is partially visible), the control system 102 may determine to use a single (or below a predetermined number of) manipulation device 150 and/or a single (or below a predetermined number of) manipulation tool 152 of the manipulation device 150. The control system may select the manipulation device 150 (from a larger set of manipulation devices 150) that has a manipulation tool 152 with a head attachment 156 configured for that type of manipulation. As noted, the control system can select a head attachment 156 that is a rubber-coated roller configured for unfolding items, a head attachment 156 that is a brush for uncrinkling items, etc. In another example, for items that need a greater amount of manipulation (e.g., the item may be flipped, making the barcode on the item completely obscured), the control system 102 may determine to use multiple manipulation devices 150 and/or multiple manipulation tools 152 of one or more of the manipulation devices 150. The control system may select the manipulation device (s) 150 with manipulation tool(s) 152 that have head attachment(s) 156 configured for greater manipulation of items. As noted, in general, the combination of manipulation devices 150 and manipulation tools 152 on the manipulation devices 150 that are selected may be determined using one or more machine learning techniques, using the information about the item's dimensions, type of item, and barcode visibility as inputs.

FIGS. 2A-2D depict different views of an example manipulation device 150, according to one embodiment. In particular, FIGS. 2A-2D show a perspective view, a top view, a front view, and a side view, respectively, of the manipulation device 150. The manipulation device 150 includes a support frame 202, which provides a structure for mounting various components (e.g., tool assembly, gearbox, motors, sensors, etc.) of the manipulation device 150. The manipulation device 150 can be used at various heights and can accommodate induction conveyors 122 with different dimensions. In the embodiment shown in FIGS. 2A-2D, for example, the support frame 202 may have a width (w) across an induction conveyor 122. The manipulation device may include a manipulation tool 152 mounted at a height (h) relative to the base of the support frame 202.

The manipulation device 150 includes an arm assembly 220, which provides a structure for attaching or mounting the manipulation tool 152. In the embodiment shown in FIGS. 2A-2D, the arm assembly 220 includes a shaft 214, a first arm member 220A, a second arm member 220B that is parallel to the first arm member 220A, a third arm member 220C, and a fourth arm member 220D. The shaft 214 is perpendicular to the first and second arm members 220 A-B. In particular, the shaft 214 is connected to the first and second arm members 220 A-B at a location (distal to the head attachment 156) along the first arm member 220A and second arm member 220B. The third arm member 220C extends perpendicular to and is disposed between the first and second arm members 220 A-B. Similarly, the fourth arm member 220D extends perpendicular to and is disposed between the first and second arm members 220 A-B. In some embodiments, the distance (d) between the first arm member 220A and the second arm member 220B may be based in part on the length of the induction conveyor 122. In one embodiment, the location along the first arm member 220A and second arm member 220B where the shaft 214 is connected, depends on a desired swivel length s of the manipulation tool 152.

Figure 3A:
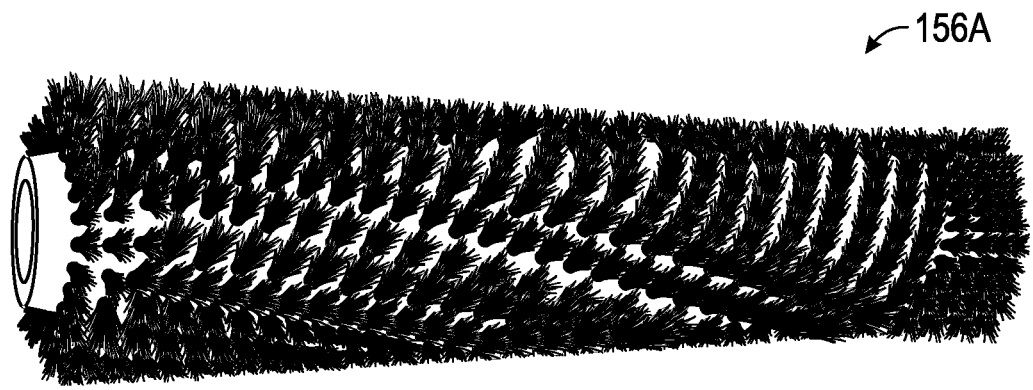
FIGS. 3A and 3B illustrate different types of head attachments, according to one embodiment.
Figure 3B:
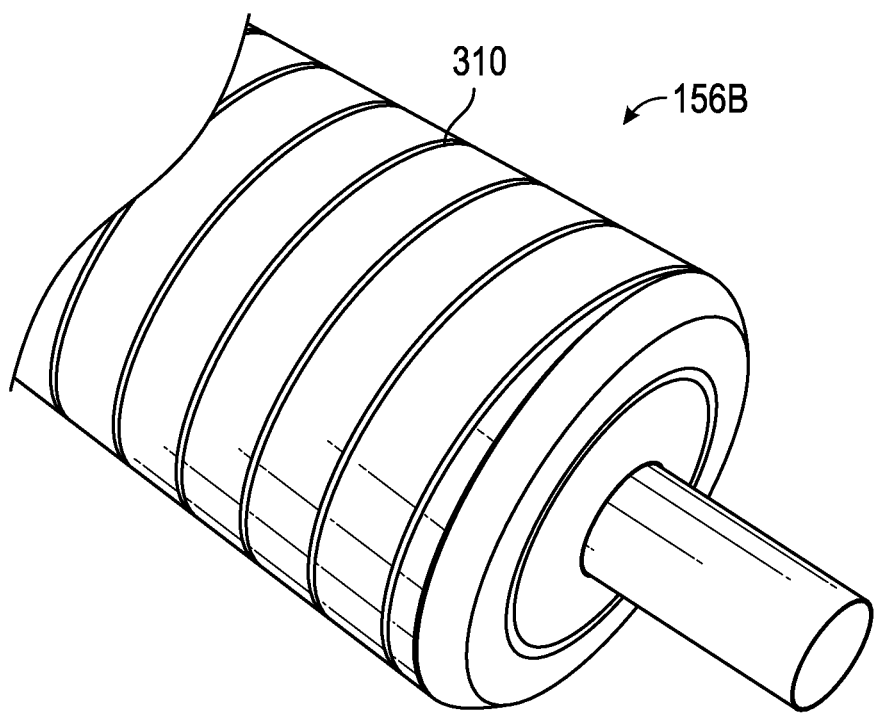

The head attachment 156 of the manipulation tool 152 is disposed perpendicular to and connected between the first and second arm members 220 A-B at first ends of the first and second arm members 220 A-B. In the embodiment shown in FIGS. 2A-2D, the head attachment 156 is a roller. As noted, however, in other embodiments, the head attachment 156 can be configured with other types of attachments. FIG. 3A, for example, depicts a brush head attachment 156A and FIG. 3B depicts a head attachment 156B having a groove 310 in a spiral pattern on the surface of the roller.

Referring back to FIGS. 2A-2D, the head attachment 156 includes an internal bearing 216, which is used, in part, to control movement (e.g., spinning or rotation) of the head attachment 156. The manipulation tool 152 also includes a head motor 158 (e.g., gearmotor), which is disposed perpendicular to and connected between the first and second arm members 220 A-B and second ends of the first and second arm members 220 A-B. Here, the second ends are distal to the first ends of the first and second arm members 220 A-B, where the head attachment 156 is connected. The head motor 158 is configured to drive a belt 210, which extends around the bearing 216 in a grooved portion of the head attachment 156. By driving the belt 210, the head motor 158 can spin the head attachment 156 forwards and/or backwards to manipulate an item.

The manipulation device 150 includes a tool motor 154, which is used to control movement of the arm assembly 220. In the embodiment shown in FIGS. 2A-2D, the tool motor 154 (e.g., servo motor) is coupled to the shaft 214 via spider coupling (e.g., lovejoy couplers) 212. Note, however, that FIGS. 2A-2D depict a reference example of how the tool motor 154 can be coupled to the shaft 214, and that the tool motor 154 can be coupled to the shaft 214 in other configurations. In one embodiment, the tool motor 154 is an incremental drive motor that has an encoder for determining position. The tool motor 154 can drive the shaft 214 in order to rotate the door assembly 220 about an axis extending along a length of the shaft 214. The tool motor 154 can rotate the door assembly 220 with a swivel length (s) in order for the manipulation tool 152 to interact with an item on the induction conveyor 122.

Figure 4A:
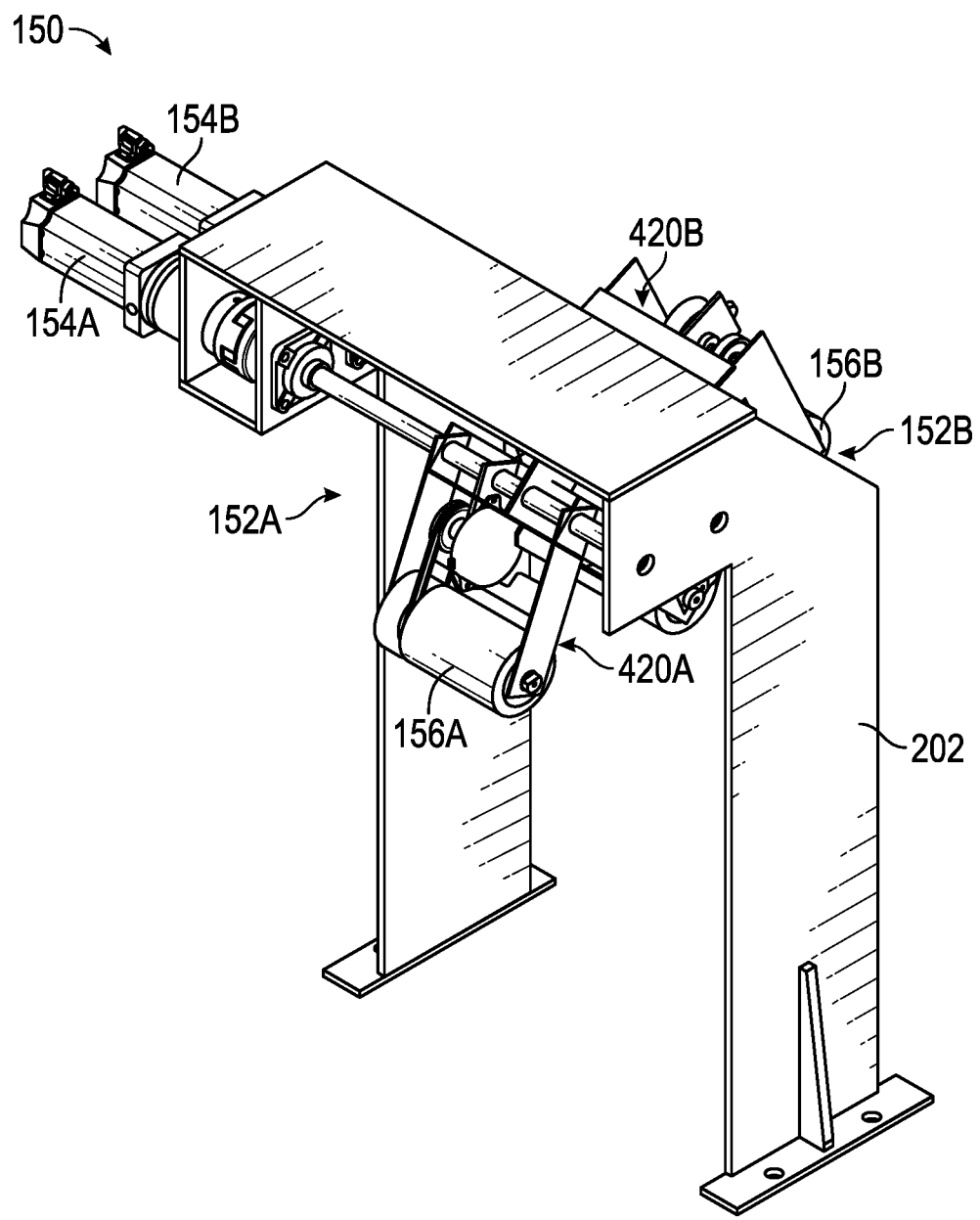
FIG. 4A shows a perspective view of another manipulation device, according to one embodiment.
Figure 4C:
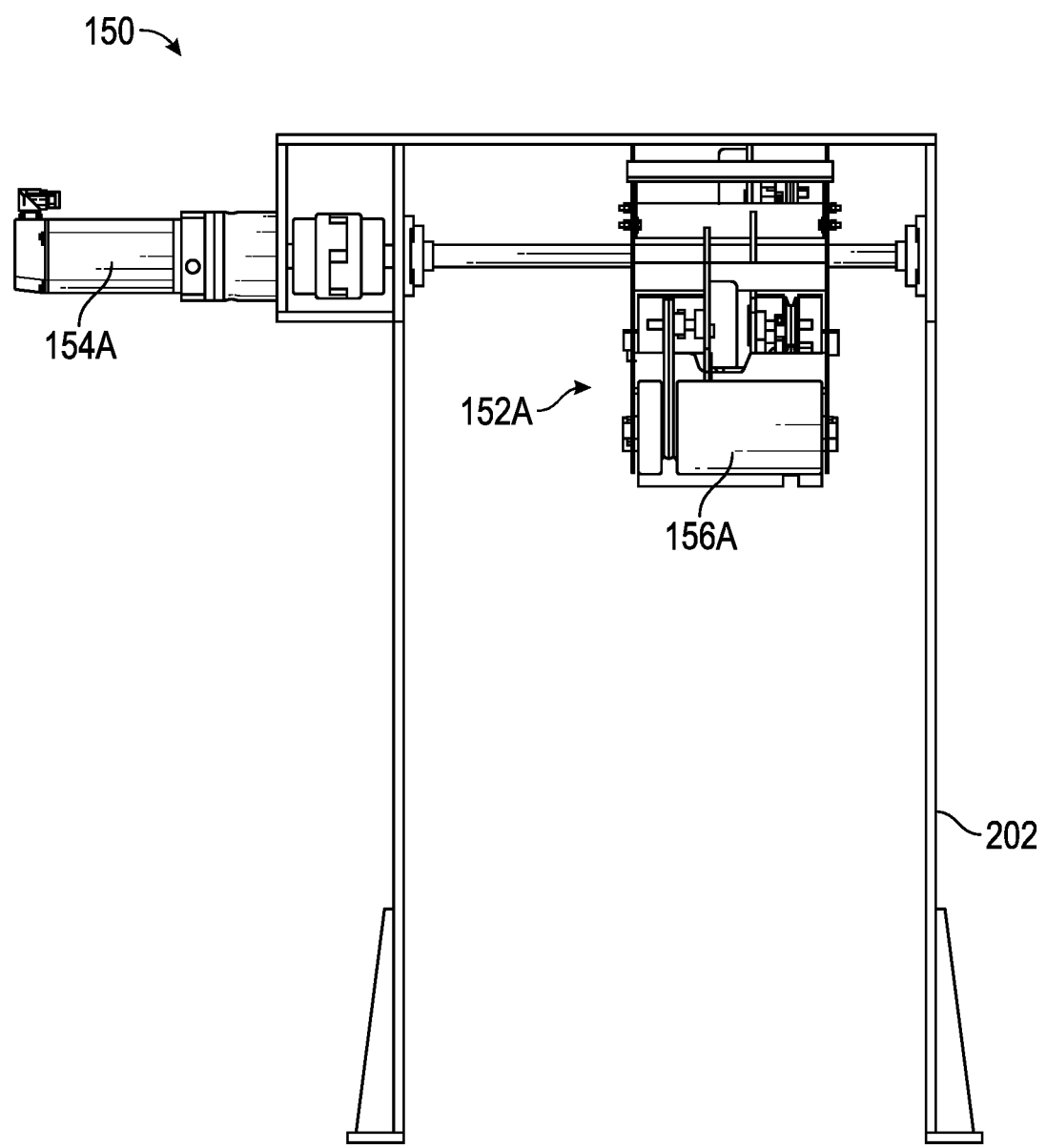
FIG. 4C shows a front view of the other manipulation device, according to one embodiment.

Note that while FIGS. 2A-2D depict the manipulation device 150 with a single manipulation tool 152, in other embodiments, the manipulation device 150 can be configured with multiple manipulation tools 152. FIGS. 4A-4C depict different views of an example manipulation device 150 with multiple manipulation tools 152, according to one embodiment. In particular, FIGS. 4A-4C show a perspective view, a top view, and a front view, respectively, of a manipulation device 150 with multiple manipulation tools 152 A-B. Similar to the manipulation device 150 depicted in FIGS. 2A-2D, each of the manipulation tools 152 A-B includes an arm assembly 420A and 420B, respectively, which provides a structure for attaching or mounting the respective manipulation tool 152. Each manipulation tool 152 A-B includes a respective tool motor 154 A-B for rotating the manipulation tool 152 about the axis extending along the shaft 214 for that tool motor 154. Similarly, each manipulation tool 152 A-B includes a respective head motor 158 A-B for controlling the movement of the head attachment 156 A-B coupled to the head motor 158 A-B.

Figure 5:
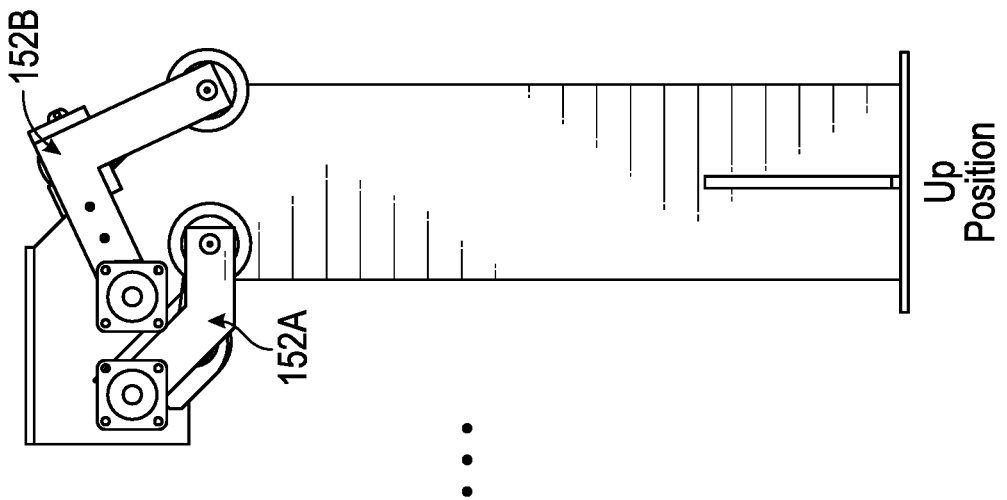
FIG. 5 depicts an example control sequence for a manipulation device, according to one embodiment.
Figure 5:
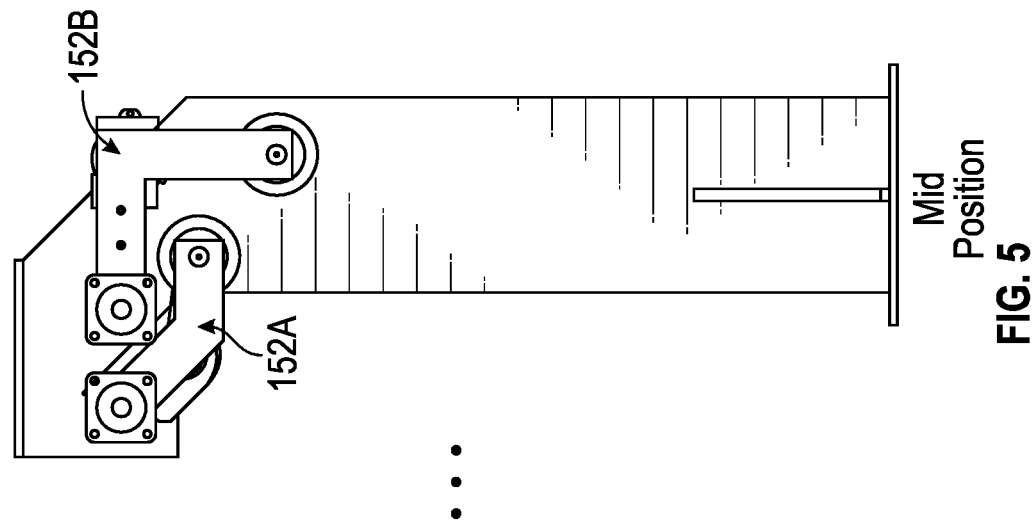
Figure 5:
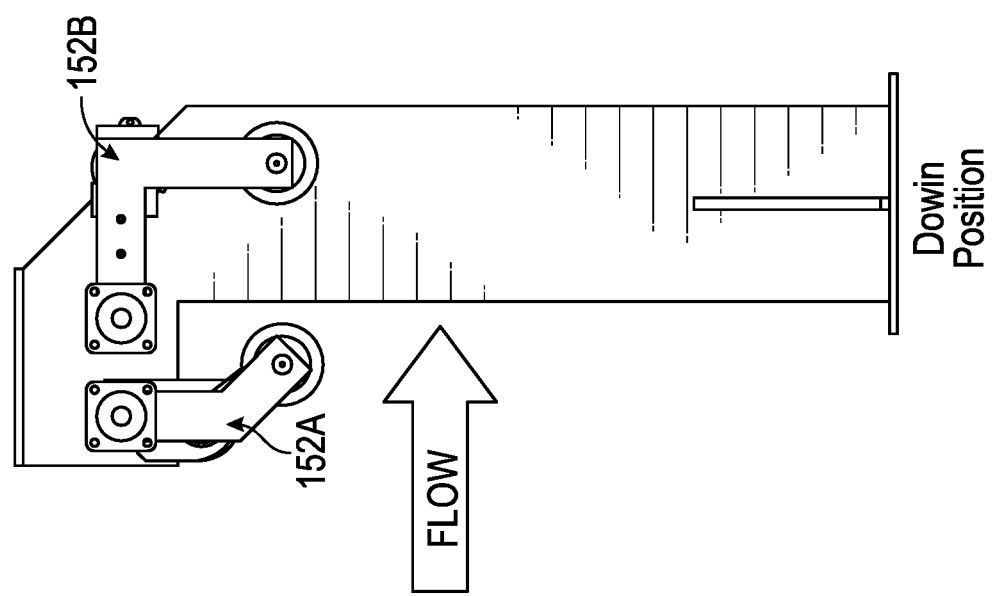

When multiple manipulation tools 152 are configured for a manipulation device 150, the arm assemblies may have different configurations in order to accommodate the movement of the manipulation tools 152 towards items on the induction conveyor 122. FIG. 5, for example, depicts the manipulation tool 152A having a different arm assembly configuration than the manipulation tool 152B, in one embodiment. As shown in FIG. 5, in one example flow sequence, the control system 102 can move the manipulation tools 152 A-B into a first (down) position, e.g., in order to allow the manipulation tool 152A to interact with an item. At a subsequent time instance, the control system 102 can move the manipulation tool 152A into a second (mid) position, e.g., in order to allow the manipulation tool 152B to interact with the item. At a subsequent time instance, the control system 102 can move the manipulation tool 152B into a third (up) position to allow the item to pass through the manipulation device 150.

Note that while FIGS. 2A-2D and 4A-4C illustrate different embodiments of the manipulation device 150 having a head motor 158 disposed separate from the head attachment 156 and driving the head attachment 156 via one or more belts, embodiments herein are not limited to these particular configurations. For example, in other contemplated embodiments, a motor driven roller (MDR) (or drum motor or motorized pulley) could be utilized as the head attachment 156 in order to manipulate an item. A MDR, for example, may include a motor drive enclosed within the cylinder of the roller that enables the roller to be self-driven (e.g., without a separate motor).

In these other contemplated embodiments, the arm assembly of the manipulation tool 152 may have a different configuration than the arm assembly 220 depicted in FIGS. 2A-2D, but perform in substantially the same manner. For example, because the MDR is generally self-driven, the arm assembly for a MDR type head attachment may include parallel arm members that are connected to the (perpendicular) shaft of the tool motor at ends of the parallel arm members (e.g., as opposed to the ends of the parallel arm members being connected to a head motor as shown in FIGS. 2A-2D). Similarly, the arm assembly for a MDR type head attachment may not require a pulley for driving the head attachment, since the MDR includes an internal motor that allows for it to be self-driven.

Figure 6:
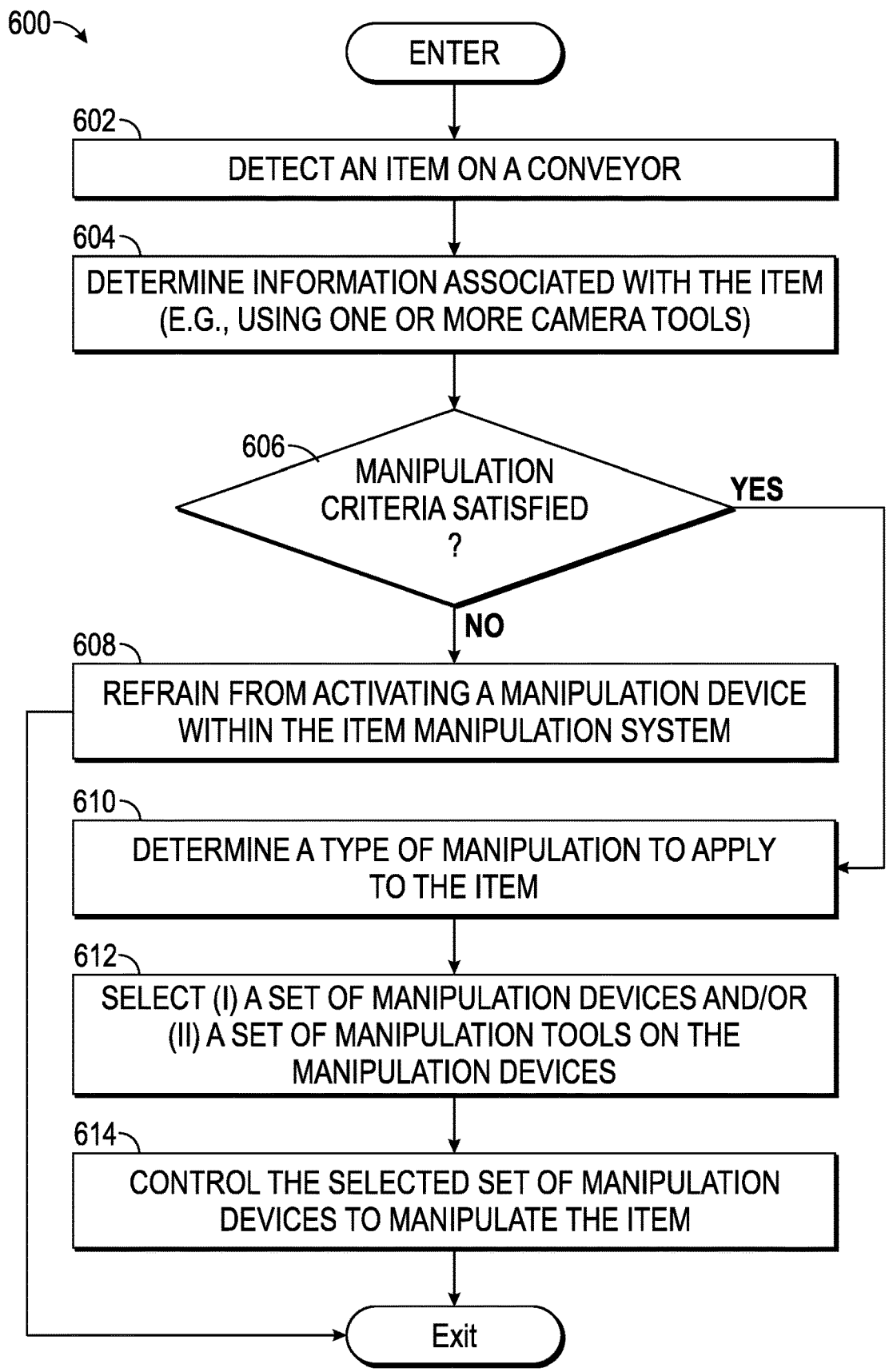
FIG. 6 is a flowchart of a method for manipulating an item, according to one embodiment.

FIG. 6 is a flowchart of a method 600 for manipulating an item, according to one embodiment. The method 600 may be performed by a control system (e.g., control system 102).

Method 600 may enter at block 602, where the control system detects an item on a conveyor (e.g., induction conveyor 122). At block 604, the control system determines information associated with the item. For example, as noted, the control system may receive information regarding the type of item, the item's dimensions, whether identifying information (e.g., a barcode) for the item is visible, etc., via one or more camera tools 140. At block 606, the control system determines if one or more manipulation criteria is satisfied. In one embodiment, the manipulation criteria includes the item being improperly oriented for induction into another facility tool (e.g., facility tool 120B). In another embodiment, the manipulation criteria includes the item having an obscured barcode.

If a manipulation criterion is not satisfied, the control system determines to refrain from activating a manipulation device (e.g., manipulation device 150) within the item manipulation system (e.g., item manipulation system 130) (block 608). On the other hand, if a manipulation criterion is satisfied, the control system determines a type of manipulation to perform, based in part on the information received in block 604 (block 610). For example, as noted, the control system can use the information as input into a machine learning algorithm to determine the type of manipulation to perform. At block 612, the control system selects (i) a set of manipulation devices and/or (ii) a set of manipulation tools on each of the set of manipulation devices, based on the determination. At block 614, the control system controls the selected manipulation devices to manipulate the item. The method 600 may then exit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An item manipulation system comprising:
   one or more camera devices configured to detect an item on a conveyor belt and determine information associated with the item;
   a manipulation apparatus configured to manipulate the item on the conveyor belt, the manipulation apparatus comprising:
      at least one manipulation tool comprising a head attachment for manipulating the item on the conveyor belt, wherein the head attachment comprises a brush configured to uncrinkle items;
      a first driver coupled to the at least one manipulation tool and configured to control movement of the at least one manipulation tool; and
      a second driver coupled to the head attachment and configured to control movement of the head attachment; and
   a controller configured to, upon determining, based on the information associated with the item, that identifying information on the item is not visible, control the at least one manipulation tool of the manipulation apparatus to flatten, unfold, or uncrinkle the item on the conveyor belt using the head attachment to make the identifying information visible.

2. The item manipulation system of claim 1, wherein the information comprises at least one of dimensions of the item, a type of the item, and an indication of whether identifying information on the item is visible by the one or more camera devices.

3. The item manipulation system of claim 1, wherein the controller is configured to control the at least one manipulation tool to manipulate the item on the conveyor belt by instructing the first driver to rotate the at least one manipulation tool about a first axis so that the head attachment encounters the item on the conveyor belt.

4. The item manipulation system of claim 1, wherein the controller is configured to control the at least one manipulation tool to manipulate the item on the conveyor belt by instructing the second driver to rotate the head attachment about a second axis so that at least one of position of the item and an orientation of the item on the conveyor belt is altered by the head attachment.

5. The item manipulation system of claim 1, wherein:
   the manipulation apparatus is one of a plurality of manipulation apparatuses of the item manipulation system; and
   the controller is further configured to select the manipulation apparatus from the plurality of manipulation apparatuses to manipulate the item based on the information associated with the item.

6. The item manipulation system of claim 1, wherein:
   the manipulation apparatus comprises a plurality of manipulation tools; and
   the at least one manipulation tool comprises a subset of the plurality of manipulation tools.

7. An item manipulation apparatus comprising:
   a first arm assembly comprising a first arm, a second arm parallel to the first arm, a first shaft disposed between the first arm and the second arm at a first location along the first arm and the second arm, and a first head attachment disposed between the first arm and the second arm at a second location along the first arm and the second arm;

a first driver coupled to the first shaft and configured to control movement of the first arm assembly about a first axis extending along a length of the first shaft;

a second driver coupled to first head attachment and configured to control movement of the first head attachment about a second axis extending along a length of the first head attachment; and a second arm assembly comprising a second head attachment, wherein the second head attachment comprises:

a third arm, a fourth arm parallel to the third arm, a second shaft disposed between the third arm and the second arm at a first location along the third arm and the fourth arm, wherein the second head attachment is disposed between the third arm and the fourth arm at a second location along the third arm and the fourth arm;

a third driver coupled to the second shaft and configured to control movement of the second arm assembly about a third axis extending along a length of the second shaft; and a fourth driver coupled to the second head attachment and configured to control movement of the second head attachment about a fourth axis extending along a length of the second head attachment.

8. The item manipulation apparatus of claim 7, wherein the first arm assembly and the first head attachment are independently movable about the respective first axis and the second axis.

9. The item manipulation apparatus of claim 7, further comprising a sensor configured to detect a position of the first arm assembly about the first axis.

10. The item manipulation apparatus of claim 7, further comprising a sensor configured to determine an amount of force applied to an item by the first head attachment.

11. The item manipulation apparatus of claim 7, wherein the first head attachment is configured to change at least one of a position and orientation of an item in order to make a barcode on the item visible by at least one scanning device.

12. The item manipulation apparatus of claim 7, wherein the first head attachment comprises a roller configured for at least one of flattening and unfolding items.

13. The item manipulation apparatus of claim 7, wherein the first head attachment comprises a brush configured for uncrinkling an item.

14. The item manipulation apparatus of claim 7, wherein the first head attachment is different from the second head attachment.

15. A method for manipulating an item on a conveyor belt, the method comprising:

detecting a presence of the item on the conveyor belt;

upon determining that a predetermined condition for manipulating the item is satisfied, determining a type of a manipulation to apply to the item on the conveyor belt;

selecting a first set of manipulation devices of a manipulation apparatus to manipulate the item instead of a second set of manipulation devices of the manipulation apparatus, based on the type of manipulation, wherein the first set of manipulation devices include a first type of head attachment and the second set of manipulation devices include a second type of head attachment wherein the first head attachment comprises a brush configured to uncrinkle items; and controlling the first set of manipulation devices to apply the type of manipulation to the item on the conveyor belt.

16. The method of claim 15, wherein the predetermined condition comprises at least one of: (i) an indication that identifying information on the item is obscured from view by a scanning device and (ii) an indication that at least one dimension of the item is outside of a predefined range.

17. The method of claim 15, wherein selecting the first set of manipulation devices comprises selecting, for at least one of the first set of manipulation devices, a set of head attachments to use to manipulate the item.

18. The method of claim 15, wherein determining the type of manipulation to apply to the item comprises evaluating at least one of a type of the item and dimensions of the item with a machine learning algorithm.

\* \* \* \* \*